United States Patent [19]

Culpepper

[11] Patent Number: 4,958,168

[45] **Date of Patent: * Sep. 18, 1990**

[54] INKJET DROP GENERATOR

[75] Inventor: Mark Culpepper, Jonesboro, La.

[73] Assignees: Ricoh Company, Ltd., Japan; Ricoh Corporation, San Jose, Calif.

[ * ] Notice: The portion of the term of this patent subsequent to Oct. 27, 2004 has been disclaimed.

[21] Appl. No.: 27,869

[22] Filed: Mar. 19, 1987

Related U.S. Application Data

[63] Continuation-in-part of Ser. No. 859,480, May 5, 1986, Pat. No. 4,703,330.

[51] Int. Cl.[5] .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,138,687 | 2/1979 | Cha et al. | 346/75 |
| 4,380,018 | 4/1983 | Andoh et al. | 346/140 R |
| 4,587,528 | 5/1986 | Beaudet | 346/75 |
| 4,703,330 | 10/1987 | Culpepper | 346/75 |

*Primary Examiner*—Bruce A. Reynolds
*Assistant Examiner*—Gerald E. Preston
*Attorney, Agent, or Firm*—Flehr, Hohbach, Test, Albritton & Herbert

[57] ABSTRACT

An inkjet printer applies symmetrical driver vibrations to the full length of a linear nozzle array. A nozzle array and nozzle support plate are supported on the end of a supporting housing which also supports a plate for defining an ink flow cavity. The housing also defines an acoustic cavity which extends from the ink cavity to an end of the acoustic transducer and is filled with acoustically transmissive material. A transducer is bonded to the distal end of this acoustic material, so that when the transducer is energized, the vibrations are transmitted uniformly through the acoustically transmissive material and the acoustic cavity to the ink cavity, symmetrically driving the ink out through the nozzles of the nozzle plate. It has been found that the acoustic cavity in fact has a critical length which is related to the frequency of operation of this system. Specifically, for a frequency of 110 KHz, the length of the acoustic cavity should be 4.7 mm; for an operating frequency of 120 KHz, the length of the acoustic cavity from the ink cavity to the face of the transducer should be 4.2 mm. In order to produce uniform vibrations at the face of the transducer, grooves extend up from the distal end of the transducer about 9/10 of the way to the surface of the transducer which is bonded to the aroustic cavity material. These grooves should have a width of about 0.56 mm.

6 Claims, 2 Drawing Sheets

INKJET DROP GENERATOR

The subject application is a continuation in part of U.S. application Ser. No. 859,480, filed on May 5,1986, by Mark Culpepper and issued on Oct. 27, 1987, as U.S. Pat. No. 4,703,330.

This invention is directed generally to the field of inkjet drop generators of the continuous type, and more particularly to an improved design for the stimulator of a drop generator.

BACKGROUND OF THE INVENTION

When a plurality of inkjet nozzles is connected to a pressurized ink cavity, it is desirable that the droplets produced from the stream passing through each of the nozzles have substantially the same breakoff point, be substantially uniform in size, have substantially uniform space between the droplets, and be satellite free. This insures that the quality of the print from each of the nozzles will be substantially the same.

To obtain this uniformity between the droplets of the various streams, it is necessary that the perturbations applied to each ink stream be substantially uniform, and that the nozzle be of uniform quality. Furthermore, for the production of the droplets to be satellite free, it is also necessary that the perturbations be sufficiently strong. It is also necessary for the perturbations not only to be substantially uniform, but to be reproducible throughout the time the droplets are being produced.

To meet these basic requirements, it is necessary that the transducer or driver producing the vibrations for causing perturbations in the ink streams be capable of operation so that the amplitude of each of the pressure waves produced in the ink cavity by the driver is substantially the same at the entrance to each inkjet nozzle. This will produce uniform perturbations in the inkjet streams flowing through the nozzles. It is also necessary for the amplitude of the pressure waves to be sufficiently high to produce satellite free droplets With respect to the intended orientation of the various components in the total structure, it should be understood that the length of both the transducer and the ink cavity is parallel to a line connecting the entrances of the nozzles of the array. Thus, the required transducer vibration mode that produces uniform perturbations for the array of inkjet stream is that in which the vibrations are "in phase" along the length direction of the transducers, and that the amplitudes are uniform for a sufficient portion of the transducer length along which the nozzle array is in alignment. This vibration mode is typically referred to as a symmetrical mode of operation.

While the foregoing describes what is necessary to produce uniform perturbations for the array of inkjet streams, non-uniformity of the perturbations in the ink streams is due both to non-symmetrical driver vibrations and end conditions. Non-symmetrical driver vibrations are those which are not in phase along the length direction and/or non-uniform in amplitude.

One cause of end conditions is due to the end walls of the ink cavity acting on the ink as the pressure wave moves through the ink in the ink cavity. This diminishes the amplitude of the pressure wave.

Another source of irregular output is the presence of bubbles in the ink stream. These occur especially in large size ink cavities such as are typical of prior art systems.

SUMMARY OF THE INVENTION

It is therefore an objective of this invention to provide an improved device for generating the perturbations which are to drive the ink stream through the nozzles.

More particularly, it is an objective of this invention to provide a transducer for an inkjet generator which is so designed and mounted as to produce in-phase drop generation along the full length of the nozzle array.

Yet another objective herein is to provide a transducer mounting that provides uniform ink stream perturbations.

Another objective is to avoid non-symmetrical driver vibrations, end conditions, and the occurrence of bubbles in the ink stream which impairs the performance of many inkjet driver designs must be removed or avoided.

Another objective is to provide a symmetrical driver vibration over the length of the piezoelectric transducer, and to so dispose the linear array of nozzles in alignment of the driver transducer and the pressure wave produced by that driver that the pressure waves arrive at the nozzles in phase and with substantially the same amplitude.

To obtain these symmetrical driver vibrations applied to the full length of the linear nozzle array, a drop generator is provided in which the nozzle array and nozzle support plate are supported on the end of a supporting housing which also supports a plate for defining an ink flow cavity, and which defines an acoustic cavity which extends from the ink cavity to the end of the acoustic transducer and comprises acoustically transmissive material. The transducer is bonded to the distal end of this acoustic material, so that when the transducer is energized, the vibrations are transmitted uniformly through the acoustically transmissive material and the acoustic cavity to the ink cavity, symmetrically driving the ink out through the nozzles of the nozzle plate.

It has been found that the acoustic cavity in fact has a critical length which is related to the frequency of operation of this system. Specifically, for a frequency of 110 KHz, the length of the acoustic cavity should be 4.7 mm; for an operating frequency of 120 KHz, the length of the acoustic cavity from the ink cavity to the face of the transducer should be 4.2 mm.

In order to produce uniform vibrations at the face of the transducer, grooves extend up from the distal end of the transducer about 9/10 of the way to the surface of the transducer which is bonded to the acoustic cavity material. These grooves should have a width of about 0.56 mm.

BRIEF DESCRIPTION OF THE DRAWINGS

The above and other objects, features and advantages of this invention will be apparent from the following more particular description of a preferred embodiment of the invention as illustrated in the accompanying drawings.

DESCRIPTION OF A PREFERRED EMBODIMENT

Figure 1:
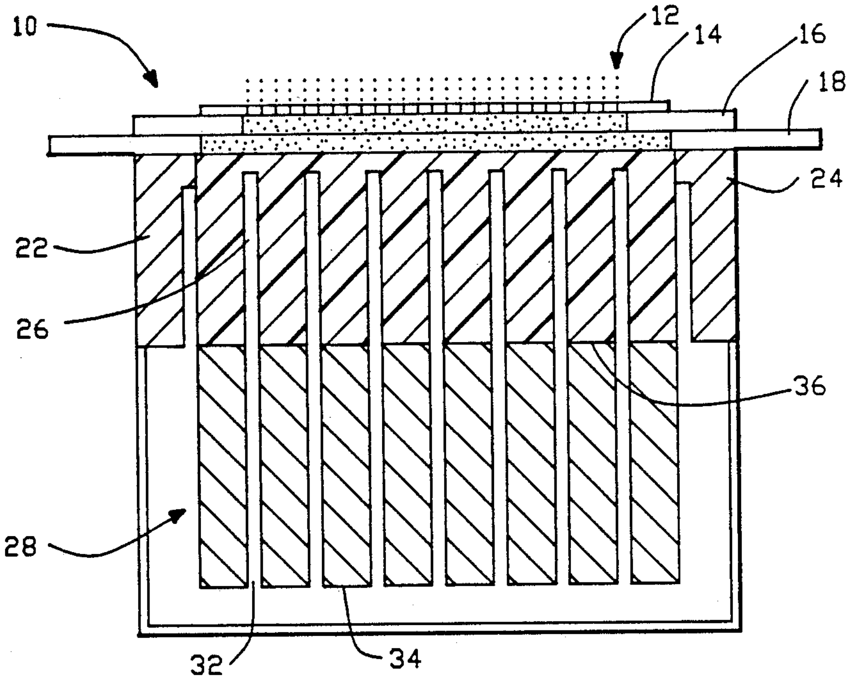
FIG. 1 is a side elevational view of the essential elements of the inkjet drop generator of this invention.
Figure 2:
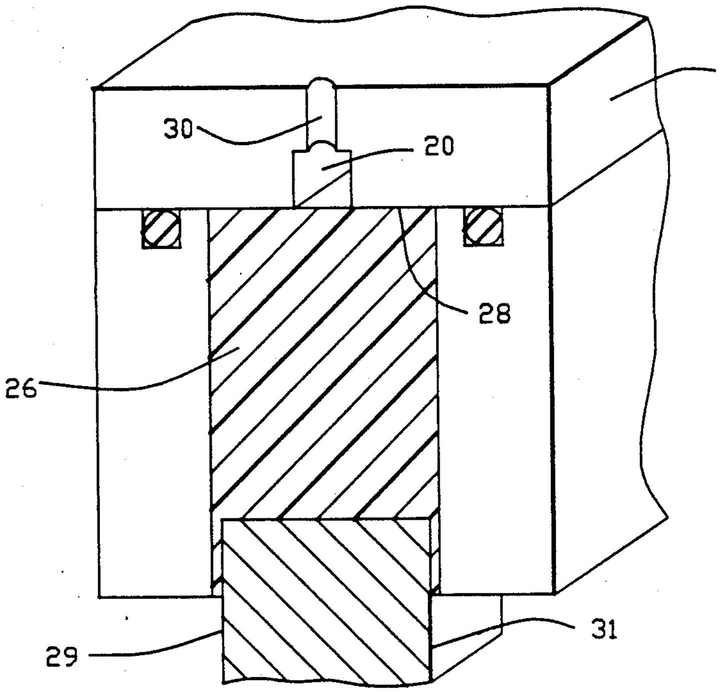
FIG. 2 is an enlarged perspective view along the section line AA of FIG. 1, showing the relationship of the transducer, acoustic cavity, fluid cavity and nozzle.

Referring to the drawings and particularly to FIGS. 1 and 2, there is shown an inkjet head 10 having a plurality of equally spaced nozzles 12 arranged in a linear array in a nozzle plate 14. The nozzle plate 14 is carried on a support plate 16; an ink supply pipe 18 is connected to the support plate, to provide ink to the fluid cavity 20 which is shown more clearly in FIG. 2. End walls 22 and 24 of the housing are provided to support the support plate and to define an acoustic cavity 26. It is apparent that the support plate 16 and housing 22, 24 could be integral if desired.

As shown in FIG. 2, the acoustic cavity is filled with a solid material such as rubber, plastic, epoxy, or any other material, the limiting factor being that it has an acoustic impedance approximately equal to that of the ink. It will be seen that the top surface 28 of the solid material 26 cooperates with support plate 16 to define a fluid cavity 20 through which the ink flows.

A piezoelectric transducer 28 is mounted to the other opening of the acoustic cavity 26. This piezoelectric transducer 28 provides the perturbations conveyed through the acoustic housing to the fluid cavity 20 to drive the ink out through the support plate holes 30 and through the nozzle plate 14 in order that the drops 12 may uniformly break off to be directed to the printing media. The piezoelectric transducer 28 in a preferred form has grooves 32 extending up from the bottom surface 34 of the piezoelectric transducer about 9/10 of the way up through the surface 36 at which the transducer 28 is bonded to the acoustic cavity material. These grooves 32, about 0.56 mm in width, are to prevent lateral coupling of the waves generated by activation of the transducer.

As more clearly appears in the elevational view of FIG. 2, it is important that the edges 29, 31 of the transducer 28 are spaced inward from the housing 22. This spacing is on the order of about 0.5 mm. This is necessary to prevent any coupling between the transducer 28 and the support housing 16, which would result in damping of the shock waves or perturbation produced by the transducer.

The fluid cavity 20 itself in a preferred form is square, having sides of about 1 mm. The height of the acoustic cavity has been found to be a critical dimension, with the height being matched to the desired operating frequency of the inkjet printer transducer 28. Thus, for a transducer operable at 110 KHz, the height of the acoustic cavity should be 4.7 mm; for an operating frequency of 120 KHz, the height should be 4.2 mm.

Among the advantages of these dimensions is that an acoustic transducer having this height dimension from opening surface 36 to opening surface 28 is most efficient at conveying the power of the piezoelectric transducer to the fluid cavity 20. The use of a fluid cavity 20 of the described dimensions provides a channel so small that when the unit is turned on, bubbles in the fluid stream are immediately pushed out as though the ink were being pushed through a straw. The result is an immediate start-up of the operation of the inkjet printer, without a lag time for all the ink outlet streams 12 to begin flowing, so that operation of the inkjet printer can effectively begin immediately.

Figure 3:
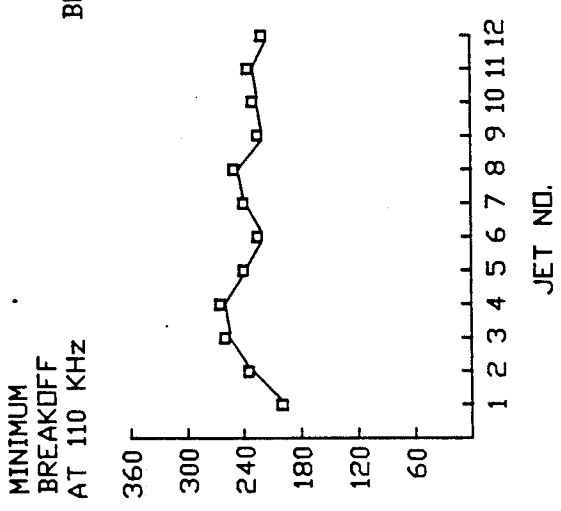
FIGS. 3, 4 and 5 illustrate test results demonstrating the efficiency of the invention in producing symmetrical outputs.
Figure 4:
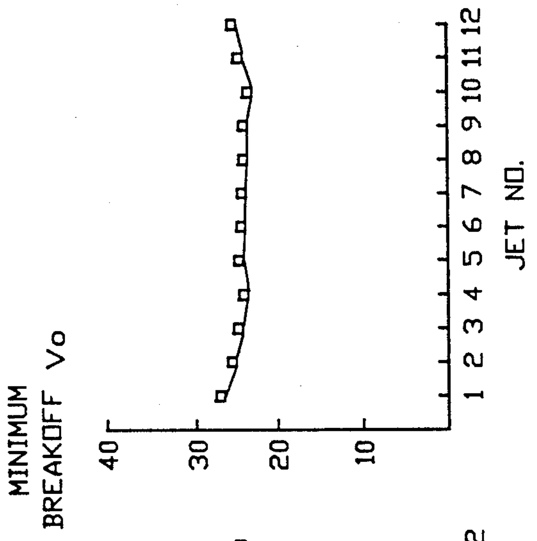
Figure 5:
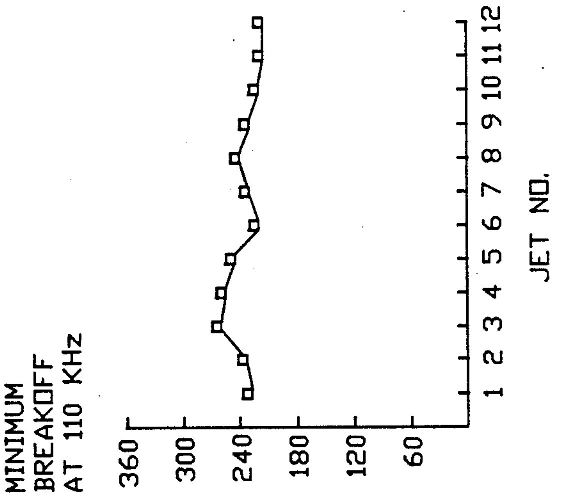

Efficiency of the unit has been tested and demonstrated as shown in FIGS. 3–5. In tests shown at two different operating frequencies, in FIGS. 3 and 5, it can be seen that all the jets are operating in phase as described in the background of this invention. This symmetrical operation is absolutely necessary to a successful inkjet printer, and has proven to be extremely difficult to achieve in long linear arrays of jets driven by a common transducer. FIG. 4 illustrates that the minimum voltage necessary to drive the transducer of this invention is relatively low with the design adopted herein. A range in the breakoff of less than 180° is considered very good. In the cases considered at both FIGS. 3 and 5, the range is about 40°, indicating that drop breakoff is relatively in phase.

In summary, this invention has proven to be highly efficient, simple in construction, operable at relatively low power, capable of immediate start-up and producing inphase inkjet drop generation from all the jets of a linear array.

Alternatives or modifications to the preferred embodiment described above may become apparent to a person of skill in the art who studies this invention disclosure. Therefore, the scope of this invention is to be limited only by the following claims.

What is claimed:

1. A drop generator for causing a plurality of ink streams to break up synchronously into droplets in order that the droplets may be charged and deflected for the purpose of printing, comprising a nozzle plate comprising a plurality of nozzles spaced along a line from which ink is jetted, a housing supporting said nozzle plate and defining an acoustic cavity having first and second openings, a solid material filling said acoustic cavity for transmitting acoustic disturbances from said first opening to said second opening, disturbance means comprising an acoustic transducer operable at a given frequency to produce said disturbances, said transducer being bonded to said acoustic cavity filling material at said first cavity opening, means for defining an ink channel across said second opening, said channel receiving said disturbances that are transmitted through said acoustic cavity material, and means for supplying ink to said ink channel, whereby said disturbances cause said ink in said channel to be synchronously propelled through said openings in said nozzle plate.

2. A drop generator as in claim 1 wherein said given frequency is 110–120 KHz, said acoustic cavity having a height from said first opening to said second opening of 4.7–4.2 mm.

3. A drop generator as in claim 1 wherein said housing comprises a material having a high acoustic impedance.

4. A drop generator as in claim 1 wherein said solid material filling said acoustic cavity is characerized by an acoustic impedance approximately equal to that of said ink.

5. A drop generator as in claim 1 wherein said ink channel is one $mm^2$ in cross section.

6. A drop generator as in claim 1 wherein grooves extend about 9/10 of the distance from the surface of the acoustic transducer toward said first opening.

* * * * *